(12) United States Patent
Wang et al.

(10) Patent No.: US 7,679,724 B2
(45) Date of Patent: Mar. 16, 2010

(54) DETERMINING TARGET DISTANCE IN IMAGING READER

(75) Inventors: Dayou Wang, Jefferson Station, NY (US); Ming Yu, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/008,460

(22) Filed: Jan. 11, 2008

(65) Prior Publication Data

US 2009/0180098 A1    Jul. 16, 2009

(51) Int. Cl.
*G01C 3/08* (2006.01)

(52) U.S. Cl. .................................... 356/3.01
(58) Field of Classification Search ........... 356/3.01–22
See application file for complete search history.

(56) References Cited

U.S. PATENT DOCUMENTS

| 4,530,600 | A  | * | 7/1985  | Lopez        | 356/5.14 |
| 5,886,775 | A  | * | 3/1999  | Houser et al. | 356/4.01 |
| 2004/0240754 | A1 | * | 12/2004 | Smith et al. | 382/286  |
| 2005/0213075 | A1 | * | 9/2005  | Cooke        | 356/28   |

* cited by examiner

*Primary Examiner*—Thomas H Tarcza
*Assistant Examiner*—Luke D Ratcliffe

(57) ABSTRACT

A target distance to a system target located at variable distances from an imaging system is determined by illuminating a calibration target at a calibration distance with a collimated light beam during a calibration mode of operation, by illuminating the system target at the variable target distance with the collimated light beam during an imaging mode of operation, by configuring the collimated light beam with a beam spot of a generally constant size during both modes of operation, by capturing return light of a calibration image size from the calibration target during the calibration mode, by capturing return light of a target image size from the system target during the imaging mode, and by determining the variable target distance based on the calibration distance, the calibration image size, and the target image size.

22 Claims, 2 Drawing Sheets

DETERMINING TARGET DISTANCE IN IMAGING READER

DESCRIPTION OF THE RELATED ART

Solid-state imaging systems or readers have been used to electro-optically read targets, such as one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417, as described in U.S. Pat. No. 5,304,786.

These solid-state imaging systems have also been used to capture images or pictures of a non-symbol target and include an imager having a one- or two-dimensional array of cells or photosensors, which correspond to image elements or pixels in a field of view of the imager. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use a solid-state imaging system for capturing a monochrome image of a target symbol as, for example, disclosed in U.S. Pat. No. 5,703,349. It is also known to use a solid-state imaging system with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

The design of a high performance imaging system for capturing the image of a target symbol and decoding the symbol, as well as capturing the image of a non-symbol target, presents many challenges. Symbols are generally located relatively close to the imager, whereas non-symbol targets whose pictures are to be taken are generally located relatively further away from the imager. Of course, in many applications, symbols themselves can be located anywhere within a wide range of working distances away from the imaging system.

Optimal performance can be achieved using auto-focus/zoom optical systems to focus at different distances from the imager; however, these optical systems use extra sensors. For example, it is known to use a rangefinder of the infrared or ultrasonic type for determining the distance to the target, and to change the focal length of these optical systems based on the distance determined by the rangefinder. It is also known to use the parallax of an aiming spot to estimate target distance. However, in practice, such measures are relatively slow, add extra complexity and expense, and degrade system performance and reliability.

SUMMARY OF THE INVENTION

One feature of the present invention resides, briefly stated, in an imaging system for, and a method of, determining a target distance to a system target located at variable distances from the system, without using a rangefinder, extra sensors or parallax. The system includes an illuminator, a solid-state imager having an array of image sensors, and a controller or microprocessor. The illuminator preferably includes a laser or a light emitting diode (LED) and a collimating lens for generating a collimated light beam.

During a calibration mode of operation, the illuminator is operative for illuminating a calibration target at a calibration distance with the collimated light beam, and the imager is operative for capturing return light of a calibration image size from the calibration target. The controller is operative for storing the calibration distance and the calibration image size in a memory for subsequent retrieval and processing.

During a subsequent imaging mode of operation, the illuminator is operative for illuminating the system target at the variable target distance with the collimated light beam, and the imager is operative for capturing return light of a target image size from the system target. The collimated light beam has a beam spot of a generally constant size during both modes of operation. The beam spot is generally circular and has a diameter not less than two millimeters in diameter in a preferred embodiment.

The controller is operative for determining the variable target distance based on the stored calibration distance, the stored calibration image size, and the target image size. The target image size is inversely proportional to the variable target distance. The controller measures the calibration image size by counting a number of the sensors that captured light from the calibration target during the calibration mode, and measures the target image size by counting a number of the sensors that captured light from the system target during the imaging mode. The controller is operative for determining the variable target distance by multiplying the stored calibration distance by the stored calibration image size divided by the target image size. This enhances system performance and reliability.

In a preferred embodiment, the system includes a housing having a window, and the illuminator is mounted in the housing and is operative for directing the collimated light beam through the window. The imager is also mounted in the housing and is operative for capturing the return light through the window. An imaging lens is advantageously provided for focusing the return light from the targets onto the image sensors. The collimated light beam during the imaging mode of operation also advantageously serves as an aiming beam for targeting the system target.

The method of determining the target distance to the system target located at variable distances is performed by illuminating a calibration target at a calibration distance with a collimated light beam during a calibration mode of operation, illuminating the system target at the variable target distance with the collimated light beam during an imaging mode of operation, configuring the collimated light beam with a beam spot of a generally constant size during both modes of operation, capturing return light of a calibration image size from the calibration target during the calibration mode, capturing return light of a target image size from the system target during the imaging mode, and determining the variable target distance based on the calibration distance, the calibration image size, and the target image size. More specifically, the determining step is performed by determining the variable target distance by multiplying the calibration distance by the calibration image size divided by the target image size.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
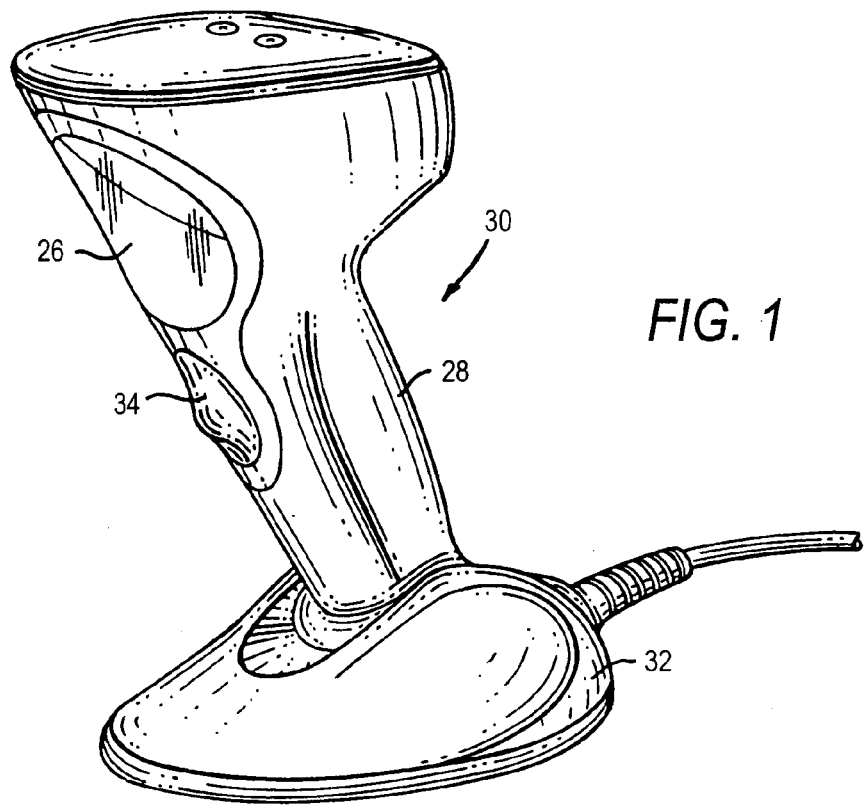
FIG. 1 is a perspective view of a portable imaging system operative in either a handheld mode, or a hands-free mode, for capturing return light from targets.

Reference numeral 30 in FIG. 1 generally identifies an imaging system or reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which a trigger 34 is manually depressed to initiate imaging of indicia to be read. In another variation, the base 32 can be omitted, and housings of other configurations can be employed.

Figure 2:
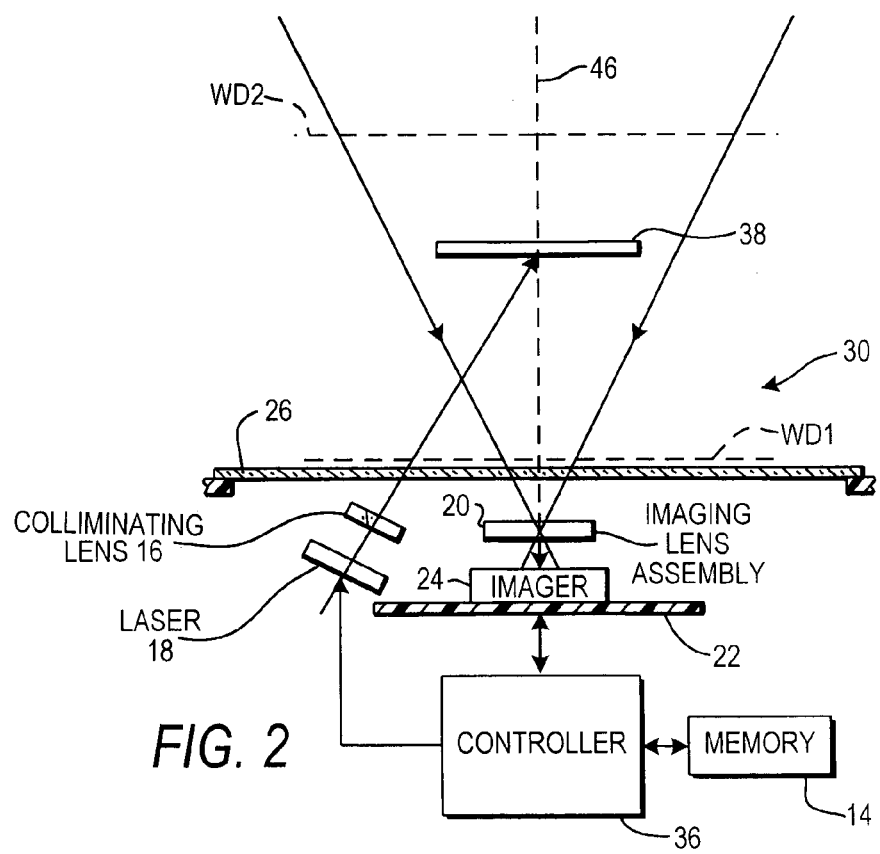
FIG. 2 is a schematic diagram of various components of the system of FIG. 1.

As schematically shown in FIG. 2, an imager 24 is mounted on a printed circuit board 22 in the reader. The imager 24 is a solid-state device, for example, a CCD or a CMOS imager, and has a one- or two-dimensional array of addressable image sensors or pixels operative for capturing return light captured and projected by an imaging lens assembly 20 along an optical path 46 through the window 26. The return light is scattered and/or reflected from a system target 38, for example, a one- and/or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 24 and generally coincides with the window 26, and WD2 can be many feet from the window 26. Typically, a symbol target is located relatively close to the window 26, whereas a non-symbol target is located relatively further away from the window 26. As described above, these different distances compromise the capability of the imaging system to rapidly acquire both non-symbol targets and symbol targets.

An illuminator is also mounted in the imaging reader and preferably includes a light source, e.g., a laser or a light emitting diode (LED) 18, and a collimating lens 16 for generating a collimated laser beam. As shown in FIG. 2, the imager 24 and the light source 18 are operatively connected to a controller or microprocessor 36 operative for controlling the operation of these components. A memory 14 is connected and accessible to the controller 36. Preferably, the microprocessor is the same as the one used for processing the return light from target symbols and for decoding the captured target images.

In operation, the microprocessor 36 sends a command signal to pulse the light source 18 for a short time period, say 500 microseconds or less, and energizes and exposes the imager 24 to collect light from a target only during said time period. A typical array needs about 33 milliseconds to acquire the entire target image and operates at a frame rate of about 30 frames per second. The array may have on the order of one million addressable image sensors.

Figure 3:
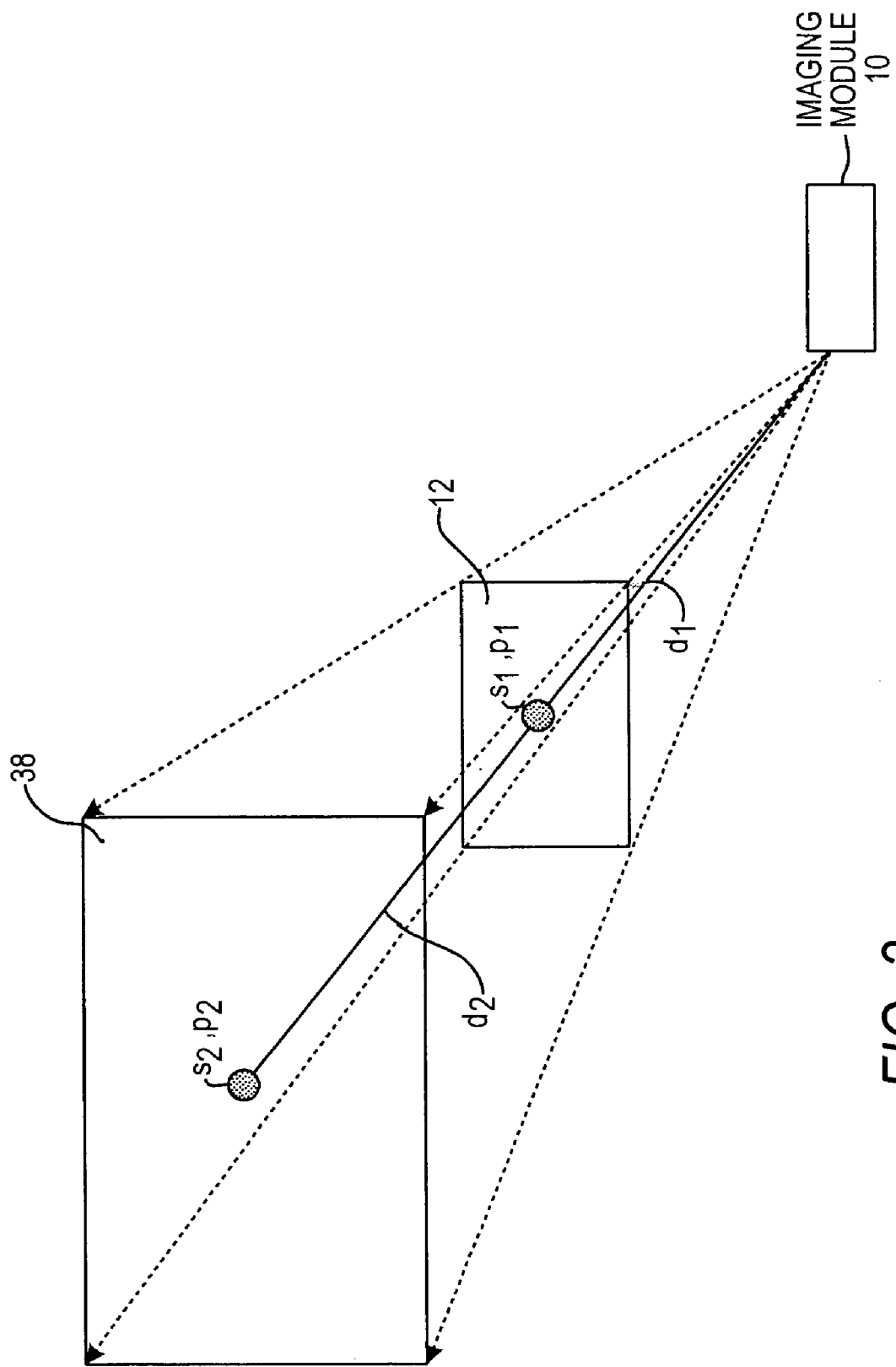
FIG. 3 is a schematic diagram depicting operation of the system of FIG. 1 in accordance with the present invention.

The imager 24, lens assembly 20, laser 18, collimating lens 16, controller 36 and memory 14 are collectively depicted in FIG. 3 as an imaging module 10. During a calibration mode of operation, the laser 18 is operative for illuminating a calibration target 12 at a calibration distance $d_1$ with the collimated laser beam, and the imager 24 is operative for capturing return light of a calibration image size $p_1$ from the calibration target 12. The controller 36 is operative for storing the calibration distance $d_1$ and the calibration image size $p_1$ in the memory 14 for subsequent retrieval and processing as known quantities.

During an imaging mode of operation, also shown in FIG. 3, the laser 18 is operative for illuminating the system target 38 at a variable target distance $d_2$ with the collimated light beam, and the imager 24 is operative for capturing return light of a target image size $p_2$ from the system target 38. The collimated light beam has a beam spot of a size $s_1$ during the calibration mode of operation, and a size $S_2$ during the imaging mode of operation. The beam spot is generally circular and has a generally constant size, that is, $s_1 = s_2$ throughout the range of working distances. The beam spot has a diameter not less than two millimeters in diameter in a preferred embodiment to obtain good accuracy.

The controller 36 is operative for determining the variable target distance $d_2$ based on the stored calibration distance $d_1$ and the stored calibration image size $p_1$ both of which are known in advance of the imaging mode, and the target image size $p_2$. The controller 36 measures the calibration image size $p_1$ by counting a number of the sensors that captured light from the calibration target 12 during the calibration mode, and measures the target image size $p_2$ by counting a number of the sensors that captured light from the system target 38 during the imaging mode.

The target image size $p_2$ is inversely linearly proportional to the variable target distance $d_2$. When the distance between the system target 38 and the module 10 changes, the target image size $p_2$ changes accordingly; hence, the size of the target image size $p_2$ is indicative of the variable target distance $d_2$. The larger the target image size $p_2$ (measured in pixels), the closer is the system target 38.

Resolution of an image is defined as the number of pixels per physical unit, e.g., length. Thus, the resolution $r_1$ of the calibration target 12 and the resolution $r_2$ of the system target 38 can be expressed as:

$$r_1/r_2 = d_2/d_1 \tag{1}$$

From geometry, it is known that:

$$s_1 = p_1/r_1 \tag{2}$$

and $$s_2 = p_2/r_2 \tag{3}$$

As noted above, since the physical size of the beam spot is substantially constant over a wide range, then:

$$s_1 = s_2 \tag{4}$$

Solving equations (1) to (4), we get:

$$d_2 = d_1 * p_1/p_2 \tag{5}$$

In other words, the controller 36 is operative for determining the variable target distance $d_2$ by multiplying the stored calibration distance $d_1$ by the stored calibration image size $p_1$ divided by the target image size $p_2$.

Once the target distance $d_2$ is known, it can be used in many ways to enhance system performance and reliability. For example, the value of the target distance $d_2$ can be used to adjust the focal length of the imaging lens assembly 20 for intelligent focusing. Whether the focus is or is not adjusted, this invention can achieve faster decode times and an extended range of working distances. Also, the value of the target distance $d_2$ can be used to instruct the controller 36 to select the appropriate decoding algorithm to decode the target symbol. One algorithm can be used for close-in symbols, while another algorithm can be used for far-out symbols. The exact location of the beam spot on a target image is unimportant. Parallax is not a factor in the distance determination.

The collimated light beam during the imaging mode of operation also advantageously serves as an aiming beam for targeting the system target.

It will be understood that each of the elements described above, or two or more together, also may find a useful application in other types of constructions differing from the types described above. Thus, imaging systems having different configurations can be used.

While the invention has been illustrated and described as determining target distance in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An imaging system for enhancing imaging system performance by determining a target distance to a system target, comprising:
    a housing spaced from the system target at a variable target distance;
    an illuminator in the housing for illuminating a calibration target spaced from the housing at a calibration distance with a collimated light beam during a calibration mode of operation, and for illuminating the system target at the variable target distance with the collimated light beam during an imaging mode of operation, the collimated light beam having a beam spot of a generally constant size during both calibration and imaging modes of operation;
    a solid-state imager in the housing and having an array of image sensors for capturing image of the calibration target during the calibration mode, and for capturing image of the system target during the imaging mode; and
    a controller in the housing operative to
        (a) determine a first image size of the beam spot in the captured image of the calibration target during the calibration mode, the first image size being the calibration image size,
        (b) determine a second image size of the beam spot in the captured image of the system target during the imaging mode, the second image size being the target image size, and
        (c) determine the variable target distance based on the calibration distance, the first image size, and the second image size for using the variable target distance determined by the controller to enhance the imaging system performance.

2. The system of claim 1, wherein the illuminator includes a laser and a collimating lens.

3. The system of claim 1, wherein the housing has a window; wherein the illuminator in the housing is operative for directing the collimated light beam through the window; and wherein the imager in the housing is operative for capturing the return light through the window.

4. The system of claim 1, wherein the beam spot is generally circular and has a diameter not less than two millimeters in diameter.

5. The system of claim 1, and a memory accessible to the controller, and wherein the controller stores the calibration distance and the calibration image size in the memory during the calibration mode.

6. The system of claim 1, wherein the controller measures the calibration image size by counting a number of the sensors that captured light from the calibration target during the calibration mode, and measures the target image size by counting a number of the sensors that captured light from the system target during the imaging mode.

7. The system of claim 1, wherein the target image size is inversely proportional to the variable target distance.

8. The system of claim 1, wherein the controller is operative for determining the variable target distance by multiplying the calibration distance by the calibration image size divided by the target image size.

9. The system of claim 1, and an imaging lens for focusing the return light from the targets with an adjustable focal length onto the image sensors, and wherein the controller uses the variable target distance determined by the controller to adjust the focal length of the imaging lens.

10. The system of claim 1, wherein the collimated light beam during the imaging mode of operation also serves as an aiming beam for targeting the system target.

11. A method of enhancing imaging system performance by determining a target distance from a housing to a system target, comprising the steps of:
    setting a variable target distance from a housing to the system target;
    illuminating a calibration target spaced from the housing at a calibration distance with a collimated light beam during a calibration mode of operation, and illuminating the system target at the variable target distance with the collimated light beam during an imaging mode of operation, and configuring the collimated light beam with a beam spot of a generally constant size during both calibration and imaging modes of operation;
    capturing an image of the calibration target during the calibration mode, and capturing an image of the system target during the imaging mode;
    determining a first image size of the beam spot in the captured image of the calibration target during the calibration mode, the first image size being the calibration image size;
    determining a second image size of the beam spot in the captured image of the system target during the imaging mode, the second image size being the target image size; and
    determining the variable target distance based on the calibration distance, the first image size, and the second image size, and using the determined variable target distance to enhance the imaging system performance.

12. The method of claim 11, wherein the illuminating step is performed by a laser and a collimating lens.

13. The method of claim 11, and configuring the housing with a window; wherein the illuminating step is performed by directing the collimated light beam through the window; and wherein the capturing step is performed by capturing the return light through the window.

14. The method of claim 11, and configuring the beam spot to be generally circular and with a diameter not less than two millimeters in diameter.

15. The method of claim 11, and storing the calibration distance and the calibration image size during the calibration mode.

16. The method of claim 11, and configuring the imager with an array of image sensors, wherein the determining step is performed by measuring the calibration image size by counting a number of the sensors that captured light from the calibration target during the calibration mode, and by measuring the target image size by counting a number of the sensors that captured light from the system target during the imaging mode.

17. The method of claim 11, wherein the target image size is inversely proportional to the variable target distance.

18. The method of claim 11, wherein the determining step is performed by determining the variable target distance by multiplying the calibration distance by the calibration image size divided by the target image size.

19. The method of claim 11, and focusing the return light from the targets onto the imager with an adjustable focal length, and wherein the using step is performed by adjusting the focal length.

20. The method of claim 11, and targeting the system target with an aiming beam simultaneously with illuminating the system target with the collimated light beam during the imaging mode.

21. The system of claim 1, wherein the controller in the housing is operative to determine the variable target distance (D2) by multiplying the calibration distance (D1) with the ratio between the first image size (P1) and the second image size (P2):

$$D2=D1*P1/P2.$$

22. The method of claim 11, wherein the determining the variable target distance includes determining the variable target distance (D2) by multiplying the calibration distance (D1) with the ratio between the first image size (P1) and the second image size (P2):

$$D2=D1*P1/P2.$$

\* \* \* \* \*

UNITED STATES PATENT AND TRADEMARK OFFICE
CERTIFICATE OF CORRECTION

| | | |
|---|---|---|
| PATENT NO. | : 7,679,724 B2 | Page 1 of 1 |
| APPLICATION NO. | : 12/008460 | |
| DATED | : March 16, 2010 | |
| INVENTOR(S) | : Wang et al. | |

It is certified that error appears in the above-identified patent and that said Letters Patent is hereby corrected as shown below:

On the Title page, Item (75), under "Inventors", Line 1, before "Jefferson" insert -- Port --.

On the Title Page, in the Figure, delete "COLLIMINATING" and insert -- COLLIMATING --, therefor.

In Fig. 2, Sheet 1 of 2, delete "COLLIMINATING" and insert -- COLLIMATING --, therefor.

In Column 4, Line 17, delete "$S_2$" and insert -- $s_2$ --, therefor.

In Column 4, Line 25, delete "$p_1$" and insert -- $p_1$, --, therefor.

In Column 8, Line 7, in Claim 21, delete "(D2)" and insert -- $(d_2)$ --, therefor at each occurrence throughout the claims.

In Column 8, Line 7, in Claim 21, delete "(D1)" and insert -- $(d_1)$ --, therefor at each occurrence throughout the claims.

In Column 8, Line 8, in Claim 21, delete "(P1)" and insert -- $(p_1)$ --, therefor at each occurrence throughout the claims.

In Column 8, Line 9, in Claim 21, delete "(P2)" and insert -- $(p_2)$ --, therefor at each occurrence throughout the claims.

In Column 8, Line 11, in Claim 21, delete "D2=D1*P1/P2" and insert -- $d_2=d_1*p_1/p_2$ --, therefor at each occurrence throughout the claims.

Signed and Sealed this
Seventeenth Day of July, 2012

David J. Kappos
*Director of the United States Patent and Trademark Office*